(12) United States Patent
Zhang et al.

(10) Patent No.: US 12,112,300 B2
(45) Date of Patent: Oct. 8, 2024

(54) INJECTING USER CONTROL FOR CARD-ON-FILE MERCHANT DATA AND IMPLICITLY-IDENTIFIED RECURRING PAYMENT TRANSACTION PARAMETERS BETWEEN ACQUIRER PROCESSORS AND ISSUER PROCESSORS OVER DATA COMMUNICATION NETWORKS

(71) Applicant: OnDot Systems Inc., San Jose, CA (US)

(72) Inventors: Zhiqiang Zhang, San Ramon, CA (US); Vaduvur Bharghavan, Morgan Hill, CA (US)

(73) Assignee: ONDOT SYSTEMS, INC., San Jose, CA (US)

( * ) Notice: Subject to any disclaimer, the term of this patent is extended or adjusted under 35 U.S.C. 154(b) by 993 days.

(21) Appl. No.: 17/069,586

(22) Filed: Oct. 13, 2020

(65) Prior Publication Data
US 2021/0133698 A1    May 6, 2021

Related U.S. Application Data

(63) Continuation-in-part of application No. 16/551,166, filed on Aug. 26, 2019, now abandoned, which is a
(Continued)

(51) Int. Cl.
*G06Q 20/02* (2012.01)
*G06F 16/215* (2019.01)
(Continued)

(52) U.S. Cl.
CPC .......... *G06Q 20/02* (2013.01); *G06F 16/215* (2019.01); *G06F 16/2379* (2019.01);
(Continued)

(58) Field of Classification Search
USPC ......................................... 705/64
See application file for complete search history.

(56) References Cited

U.S. PATENT DOCUMENTS

| 5,708,422 A | 1/1998 | Blonder |
| 5,884,289 A | 3/1999 | Anderson |

(Continued)

FOREIGN PATENT DOCUMENTS

| DE | 20 2012 013 375 U1 | 9/2016 |
| EP | 2 869 255 A1 | 5/2015 |
| WO | WO-2013/062897 A1 | 5/2013 |

OTHER PUBLICATIONS

V. Meltsov, P. Novokshonov, D. Repkin, A. Nechaev and N. Zhukova, "Development of an Intelligent Module for Monitoring and Analysis of Client's Bank Transactions," 2019 24th Conference of Open Innovations Association (FRUCT), Moscow, Russia, 2019, pp. 255-262, doi: 10.23919/FRUCT.2019.8711931. (Year: 2019).*

(Continued)

*Primary Examiner* — Patrick McAtee
*Assistant Examiner* — Eduardo Castilho
(74) *Attorney, Agent, or Firm* — FOLEY & LARDNER LLP

(57) ABSTRACT

Updates to a payment card of the specific card user that will affect subsequent payments to the COF merchants has occurred are detected based on receiving a notification from an issuer processor. In response, payment credentials can be automatically updated with the COF merchants for the specific card user.

21 Claims, 11 Drawing Sheets

Related U.S. Application Data continuation-in-part of application No. 16/227,560, filed on Dec. 20, 2018, now abandoned, and a continuation-in-part of application No. 14/058,229, filed on Oct. 19, 2013, now abandoned, and a continuation-in-part of application No. 13/527,544, filed on Jun. 19, 2012, now abandoned.

(51) Int. Cl.
　　*G06F 16/23*　　　(2019.01)
　　*G06Q 20/10*　　　(2012.01)
　　*G06Q 20/12*　　　(2012.01)
　　*G06Q 20/40*　　　(2012.01)
　　*G06Q 40/02*　　　(2023.01)

(52) U.S. Cl.
　　CPC ......... *G06Q 20/108* (2013.01); *G06Q 20/127* (2013.01); *G06Q 20/405* (2013.01); *G06Q 20/409* (2013.01); *G06Q 40/02* (2013.01)

(56) References Cited

U.S. PATENT DOCUMENTS

| | | |
|---|---|---|
| 5,892,900 A | 4/1999 | Ginter et al. |
| 5,953,710 A | 9/1999 | Fleming |
| 6,029,154 A | 2/2000 | Pettitt |
| 6,122,624 A | 9/2000 | Tetro |
| 6,343,279 B1 | 1/2002 | Bissonette |
| 6,422,462 B1 | 7/2002 | Cohen |
| 6,516,056 B1 | 2/2003 | Justice |
| 6,658,568 B1 | 12/2003 | Ginter et al. |
| 7,266,537 B2 | 9/2007 | Jacobsen et al. |
| 7,427,033 B1 | 9/2008 | Roskind |
| 7,693,771 B1* | 4/2010 | Zimmerman .......... G06Q 40/00 705/37 |
| 7,784,684 B2 | 8/2010 | Labrou et al. |
| 7,793,851 B2 | 9/2010 | Mullen |
| 7,798,416 B2 | 9/2010 | Roskind |
| 7,801,826 B2 | 9/2010 | Labrou et al. |
| 7,813,725 B2 | 10/2010 | Celik |
| 7,813,822 B1 | 10/2010 | Hoffberg |
| 7,822,688 B2 | 10/2010 | Labrou et al. |
| 7,828,220 B2 | 11/2010 | Mullen |
| 7,925,605 B1 | 4/2011 | Rubin |
| 8,127,982 B1 | 3/2012 | Casey |
| 8,284,061 B1 | 10/2012 | Dione |
| 8,417,630 B2 | 4/2013 | Wolfson et al. |
| 8,509,734 B1 | 8/2013 | Gupta et al. |
| 8,516,266 B2 | 8/2013 | Hoffberg et al. |
| 8,706,620 B2 | 4/2014 | Ciurea |
| 9,324,105 B2 | 4/2016 | Kopikare |
| 9,674,154 B1 | 6/2017 | Canavor et al. |
| 9,704,185 B2 | 7/2017 | Cunico et al. |
| 9,836,455 B2 | 12/2017 | Martens et al. |
| 10,169,768 B2 | 1/2019 | Dione |
| 10,402,829 B1 | 9/2019 | Baar et al. |
| 10,902,365 B2* | 1/2021 | Singh .................... G06Q 40/12 |
| 11,144,982 B1 | 10/2021 | Raak et al. |
| 11,734,705 B2* | 8/2023 | Walters .............. G06Q 20/0855 705/40 |
| 2002/0035539 A1 | 3/2002 | O'Connell |
| 2002/0082995 A1 | 6/2002 | Christie, IV |
| 2002/0111886 A1 | 8/2002 | Chenevich et al. |
| 2002/0123938 A1 | 9/2002 | Yu |
| 2002/0152123 A1 | 10/2002 | Giordano et al. |
| 2002/0194141 A1 | 12/2002 | Langensteiner |
| 2002/0198806 A1 | 12/2002 | Blagg |
| 2003/0028481 A1 | 2/2003 | Flitcroft |
| 2004/0039694 A1 | 2/2004 | Dunn |
| 2004/0068653 A1 | 4/2004 | Fascenda |
| 2004/0128243 A1 | 7/2004 | Kavanagh |
| 2004/0215543 A1 | 10/2004 | Betz |
| 2005/0097019 A1 | 5/2005 | Jacobs |
| 2005/0102243 A1 | 5/2005 | Kinsella |
| 2005/0172137 A1* | 8/2005 | Hopkins ................ G06Q 20/02 713/185 |
| 2005/0240527 A1 | 10/2005 | Goldman |
| 2005/0268003 A1 | 12/2005 | Wang |
| 2006/0085337 A1 | 4/2006 | Conforti et al. |
| 2006/0178986 A1 | 8/2006 | Giordano et al. |
| 2007/0039049 A1 | 2/2007 | Kupferman et al. |
| 2007/0124256 A1 | 5/2007 | Crooks et al. |
| 2007/0198495 A1 | 8/2007 | Buron et al. |
| 2008/0101283 A1 | 5/2008 | Calhoun et al. |
| 2008/0120235 A1 | 5/2008 | Chu |
| 2008/0147523 A1 | 6/2008 | Mulry et al. |
| 2008/0222038 A1 | 9/2008 | Eden |
| 2008/0228648 A1 | 9/2008 | Kemper |
| 2008/0257952 A1 | 10/2008 | Zandonadi |
| 2008/0263402 A1 | 10/2008 | Braysy |
| 2009/0012898 A1 | 1/2009 | Sharma et al. |
| 2009/0112651 A1 | 4/2009 | Atkinson |
| 2009/0132424 A1 | 5/2009 | Kendrick et al. |
| 2009/0138968 A1 | 5/2009 | Serber |
| 2009/0164327 A1 | 6/2009 | Bishop et al. |
| 2009/0164330 A1 | 6/2009 | Bishop et al. |
| 2009/0254462 A1 | 10/2009 | Tomchek et al. |
| 2009/0313147 A1 | 12/2009 | Balasubramanian |
| 2010/0022254 A1 | 1/2010 | Ashfield et al. |
| 2010/0051684 A1 | 3/2010 | Powers |
| 2010/0063903 A1 | 3/2010 | Whipple et al. |
| 2010/0106611 A1 | 4/2010 | Paulsen |
| 2010/0114776 A1 | 5/2010 | Weller et al. |
| 2010/0153224 A1 | 6/2010 | Livnat |
| 2010/0174644 A1 | 7/2010 | Rosano et al. |
| 2010/0258620 A1* | 10/2010 | Torreyson .......... G06Q 20/3572 235/379 |
| 2010/0274720 A1 | 10/2010 | Carlson |
| 2010/0280950 A1* | 11/2010 | Faith .................. G06Q 20/4016 705/44 |
| 2010/0299253 A1* | 11/2010 | Patterson ................ G06Q 40/02 705/40 |
| 2010/0325047 A1 | 12/2010 | Carlson et al. |
| 2011/0047075 A1 | 2/2011 | Fourez |
| 2011/0137804 A1 | 6/2011 | Peterson |
| 2011/0238564 A1 | 9/2011 | Lim et al. |
| 2011/0251892 A1 | 10/2011 | Laracey |
| 2011/0317804 A1 | 12/2011 | Kurjanowicz |
| 2012/0030109 A1 | 2/2012 | Dooley Maley |
| 2012/0036013 A1 | 2/2012 | Neuhaus |
| 2012/0059758 A1 | 3/2012 | Carlson |
| 2012/0066107 A1 | 3/2012 | Grajetzki |
| 2012/0072347 A1 | 3/2012 | Conway |
| 2012/0095918 A1 | 4/2012 | Jurss |
| 2012/0143730 A1 | 6/2012 | Ansari et al. |
| 2012/0197708 A1 | 8/2012 | Mullen |
| 2012/0197802 A1 | 8/2012 | Smith |
| 2012/0225639 A1 | 9/2012 | Gazdzinski |
| 2012/0271697 A1 | 10/2012 | Gilman |
| 2012/0300932 A1* | 11/2012 | Cambridge ............ G06Q 40/00 380/270 |
| 2012/0303525 A1 | 11/2012 | Sahadevan |
| 2013/0138516 A1 | 5/2013 | White |
| 2013/0282593 A1 | 10/2013 | Merz et al. |
| 2013/0290121 A1 | 10/2013 | Simakov et al. |
| 2013/0332361 A1 | 12/2013 | Ciurea |
| 2013/0332362 A1 | 12/2013 | Ciurea |
| 2013/0346294 A1 | 12/2013 | Faith |
| 2014/0040135 A1 | 2/2014 | Ovick et al. |
| 2014/0040139 A1 | 2/2014 | Brudnicki |
| 2014/0095947 A1 | 4/2014 | Mozak |
| 2014/0258119 A1 | 9/2014 | Canis |
| 2014/0263622 A1* | 9/2014 | Babatz .................... G06Q 20/34 235/380 |
| 2014/0279231 A1 | 9/2014 | Pinski et al. |
| 2014/0279309 A1 | 9/2014 | Cowen |
| 2014/0279503 A1 | 9/2014 | Bertanzetti et al. |
| 2014/0304055 A1 | 10/2014 | Faith |
| 2014/0337175 A1 | 11/2014 | Katzin et al. |
| 2014/0358769 A1 | 12/2014 | Howe et al. |
| 2014/0372304 A1 | 12/2014 | Howe |
| 2015/0045064 A1 | 2/2015 | Junkar et al. |

(56) References Cited

U.S. PATENT DOCUMENTS

| | | | |
|---|---|---|---|
| 2015/0161741 A1* | 6/2015 | Unser | G06Q 20/12 |
| | | | 705/30 |
| 2015/0242949 A1 | 8/2015 | Phillips, IV | |
| 2015/0332302 A1 | 11/2015 | Celikyilmaz et al. | |
| 2016/0155124 A1 | 6/2016 | Howe | |
| 2016/0275781 A1 | 9/2016 | Nold | |
| 2017/0024743 A1 | 1/2017 | Fogel et al. | |
| 2017/0109745 A1 | 4/2017 | Al-Bedaiwi et al. | |
| 2017/0116585 A1 | 4/2017 | Rosano | |
| 2017/0148020 A1* | 5/2017 | Vienravee | G06Q 20/405 |
| 2017/0161698 A1* | 6/2017 | Caldwell | G06Q 20/102 |
| 2017/0300894 A1 | 10/2017 | Shanmugam | |
| 2018/0005241 A1 | 1/2018 | Smothers | |
| 2018/0165759 A1 | 6/2018 | Carrington et al. | |
| 2018/0225656 A1* | 8/2018 | Ray | G06Q 20/3227 |
| 2018/0357687 A1 | 12/2018 | Groarke | |
| 2019/0095915 A1* | 3/2019 | Gjondrekaj | G06Q 20/405 |
| 2019/0147448 A1* | 5/2019 | Allbright | G06Q 20/24 |
| | | | 705/77 |
| 2019/0392443 A1* | 12/2019 | Piparsaniya | G06Q 20/14 |
| 2020/0005259 A1* | 1/2020 | Berger | G06Q 20/24 |
| 2020/0118133 A1* | 4/2020 | Schmidt | G06Q 20/102 |
| 2020/0184434 A1* | 6/2020 | Evans | G06Q 20/102 |
| 2020/0226609 A1* | 7/2020 | Dixit | G06Q 20/403 |
| 2020/0394086 A1 | 12/2020 | Lee | |
| 2021/0217035 A1* | 7/2021 | Williams | G06Q 30/0206 |
| 2021/0350340 A1* | 11/2021 | Lai | G06Q 40/02 |
| 2022/0076231 A1* | 3/2022 | Farrell | G06Q 20/3224 |

OTHER PUBLICATIONS

C. -C. Michael Yeh, Z. Zhuang, Y. Zheng, L. Wang, J. Wang and W. Zhang, "Merchant Category Identification Using Credit Card Transactions," 2020 IEEE International Conference on Big Data (Big Data), Atlanta, GA, USA, 2020, pp. 1736-1744, doi: 10.1109/BigData50022.2020.9378417. (Year: 2020).*

Anonymous, "User Initiatiated and Controlled Mobile Payment Solution," The IP.com Journal, 2021, retrieved from https://priorart.ip.com/IPCOM/000266984 (Year: 2021).*

Anonymous, "Managing Transaction Billing Across a Plurality of Billing Sources Utilizing an Interface," The IP.com Journal, 2009, retrieved from https://priorart.ip.com/IPCOM/000182419 (Year: 2009).*

Merdler, "Creating a secure channel," codeproject.com, 2008, retrieved on Oct. 14, 2012 from https://web.archive.org/web/20121014091727/https://www.codeproject.com/Articles/26332/Creating-a-secure-channel (Year: 2008).*

Anonymous, "Easy Billing Change System," retrieved from https://priorart.ip.com/IPCOM/000176153, 2008, Ip.com (Year: 2008).*

Anonymous, "Detecting fraud using information on account holder collected outside the operation of the account," ip.com Disclosure No. IPCOM000035207D, 2005, https://priorart.ip.com/IPCOM/000035207 (Year: 2005).

Anonymous, "Payment Authorization Based on a Variable Payment Authorization Score," IPCOM000153889D, 2007, https://priorart.ip.com/IPCOM/000153889 (Year: 2007).

D. Berbecaru, "LRAP: A Location-Based Remote Client Authentication Protocol for Mobile Environments," 2011 19th International Euromicro Conference on Parallel, Distributed and Network-Based Processing, 2011, pp. 141-145, doi: 10.1109/PDP.2011.32 (Year: 2011).

F.S. Park, C. Gangakhedkar and P. Traynor, "Leveraging Cellular Infrastructure to Improve Fraud Protection," 2009 Annual Computer Security Applications Conference, 2009, pp. 350-359, doi: 10.1109/ACSAC.2009.40 (Year: 2009).

J.T.S. Quah and M. Sriganesh, "Real Time Credit Card Fraud Detection using Computational Intelligence," 2007 International Joint Conference on Neural Networks, 2007, pp. 863-868, doi: 10.1109/IJCNN.2007.4371071 (Year: 2007).

N. Nassar and G. Miller, "Method for secure credit card transaction," 2013 International Conference on Collaboration Technologies and Systems (CTS), 2013, pp. 180-184, doi: 10.1109/CTS.2013.6567226. (Year: 2013).

S.W. Neville and M. Horie, "Efficiently Achieving Full Three-Way Non-repudiation in Consumer-Level eCommerce and M-Commerce Transactions," 2011IEEE 10th International Conference on Trust, Security and Privacy in Computing and Communications, 2011, pp. 664-672, doi: 10.1109/TrustCom.2011.85. (Year: 2011).

"NETRESEC Network Security Blog." NETRESEC Network Security Blog. Web. Mar. 11, 2011. <http://www.netresec.com/?page=Biog&month=20 11 -03&post=Sniffing-Tutorial-part -1 --- Intercepting-Network-Traffic>.

ISO 8583, Wikipedia, the free encyclopedia, retrieved on Jun. 9, 2011 from https://web.archive.org/web/20110609034342/https://en.wikipedia.org/wiki/ISO_8583 (Year: 2011).

Radu, Christian, Implementing Electronic Card Payment Systems, Artech House, 2002. Chapter 2 (Year: 2002).

Ranjan, "Tokenization of a physical debit or credit card for payment", IP.com, 2007, 10 pages. https://priorart.ip.com/IPCOM/000251283.

* cited by examiner

| COF Merchant | Recurring Payments | User Control |
|---|---|---|
| 24-Hour Fitness | Y – $29.99/ mo | • CANCEL OR BLOCK<br>• CONFIRM<br>• DISPUTE<br>• UPDATE CARD<br>• CLICK-TO-CONTACT MERCHANT<br>• ALERT ME |
| Gas Company | Y – 8th day of mo | • CANCEL OR BLOCK<br>• CONFIRM<br>• DISPUTE<br>• UPDATE CARD<br>• CLICK-TO-CONTACT MERCHANT<br>• ALERT ME |
| Amazon | N | • CANCEL OR BLOCK<br>• CONFIRM<br>• DISPUTE<br>• UPDATE CARD<br>• CLICK-TO-CONTACT MERCHANT<br>• ALERT ME |

FIG. 9

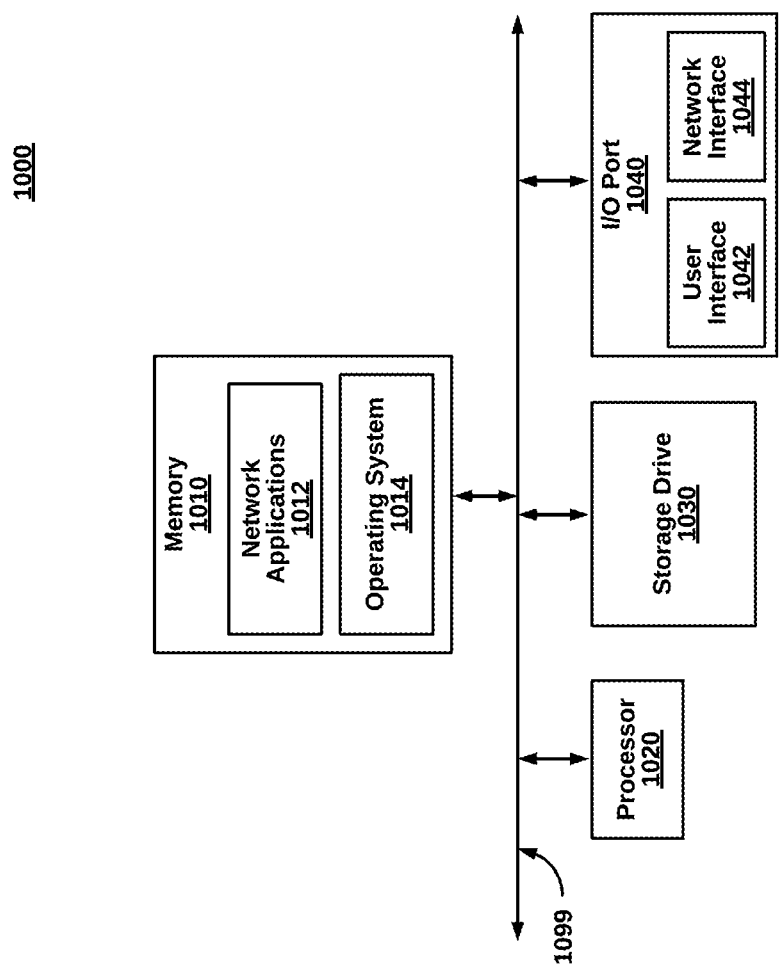

INJECTING USER CONTROL FOR CARD-ON-FILE MERCHANT DATA AND IMPLICITLY-IDENTIFIED RECURRING PAYMENT TRANSACTION PARAMETERS BETWEEN ACQUIRER PROCESSORS AND ISSUER PROCESSORS OVER DATA COMMUNICATION NETWORKS

CROSS-REFERENCE TO RELATED APPLICATIONS

This application claims priority as continuation-in-part of U.S. application Ser. No. 16/551,166 filed Aug. 26, 2019, which in turn, is a continuation in part of U.S. application Ser. No. 13/527,544 filed Jun. 19, 2012, and is a continuation-in-part of U.S. application Ser. No. 14/058,229 filed Oct. 19, 2013 and a continuation in part of U.S. application Ser. No. 16/227,560 filed Dec. 20, 2018, the contents of each being hereby incorporated by reference in their entirety.

FIELD OF THE INVENTION

The invention relates generally, to computer networking security, and more specifically, to injecting user control for user card updates automatically applied to card-on-file merchant data and recurring payment transaction parameters between acquirer processors and issuer processors over data communication networks.

BACKGROUND

On the one hand, card users rely upon availability of electronic funds for point-of-sale and online purchases with merchants. When an electronic payment fails due to issues within the system, apart from actual availability of electronic funds, card users can have services disrupted, purchases failed, and even be embarrassed in front of friends. One case of failed user card transactions arises when there is a change in the underlying user card being used for the transaction. For example, if an existing card is lost or stolen, and a new physical card is typically issued by mail to the address on file and, after receipt, the card user manually updates the card information. In the meantime, no electronic payments can be consummated.

On the other hand, card users may be suspicious of COF (card on file) merchants that store the user card information so that the user does not have to reenter for each use. In the case of recurring payments, COF merchants automatically consummate charges for a predetermined amount at a predetermined frequency, such as monthly dues for a health club membership. If a user is suspicious, card users have a lack of control over COF merchants and recurring payments. The conventional options for control are to submit a dispute with the credit card company or the merchant. But this can be time consuming and complicated.

Thus, users have a lack of control over COF merchants and recurring payments. For example, attempts to make a recurring charge to a lost or stolen card may be unintentionally made if the card user is not able to update with the new physical card in time. The unintentional transaction should be rejected by a financial transaction system. The failed transactions can raise red flags by the COF merchant or recurring transaction processor with respect to the card user. In turn, red flags can also be raised by an acquirer processor or issuer processor with respect to the COF merchant or recurring transaction processor. The result can lead to service or product cancelations, late fees, bad faith, and other consequences. There can also be a chilling effect on conducting online transactions.

What is needed is a robust technique for improving user card data stored by card-on-file merchants and recurring payment transactions between acquirer processors and issuer processors over data communication networks, in cases such as updated card information, pushing a card to a new merchant so that it can be stored on file, recommending targeted subscription services to users who may not have subscribed to merchant services yet but are exhibiting organic recurring purchasing behavior with the merchants, and other cases discussed herein.

SUMMARY

To address the above-mentioned shortcomings, methods, computer-readable mediums, and devices are provided for injecting user control to card-on-file merchant data and recurring payment transactions between acquirer processors and issuer processors over data communication networks.

In an embodiment, a database of transactions is formed form forwarded transactions from financial institutions, the forwarded transactions transmitted from an acquirer processor for approval by an issuer processor. A transaction classifier can be trained from the database of transactions to identify COF (card on file) merchants having payment credentials on file for a specific card user, and participating in account update services for a financial institution. The resulting list of the COF merchants and associated transactions, along with action buttons related to the COF merchants can be provided to card users as well as an ISO transaction approval system.

In another embodiment, updates to a card of the specific card user that will affect subsequent payments to the COF merchants has occurred are detected based on receiving a notification from an issuer processor. In response, payment credentials can be automatically updated with the COF merchants for the specific card user Advantageously, spectral analysis technology is used to improve network transaction technology. Furthermore, the technical field of network security is improved by reducing falsely declined transactions, and network performance is improved for the user.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 9 is a table illustrating an example of user controls for the list of COF merchants and recurring payments displayed on an app of card users, according to an embodiment.

FIG. 10 is a block diagram illustrating an example computing device, according to one embodiment.

DETAILED DESCRIPTION

Systems with computer hardware devices, computer-implemented methods, and (non-transitory) computer-readable mediums, for injecting user control to card-on-file merchant data and recurring payment transactions between acquirer processors and issuer processors over data communication networks, are disclosed.

The examples detailed herein are non-limiting and concise. For instance, although false declines are referred to herein as a technology that is improved by the techniques disclosed below, many other technologies such as dispute resolution and user card controls, are also improved. Moreover, merchant transactions in the ISO 8583 format for network data packets can also be applied to non-merchant transactions and other packet formats.

I. System for Injecting User Control to COF User Card Data and Transaction Parameters (FIGS. 1-4)

Figure 1:
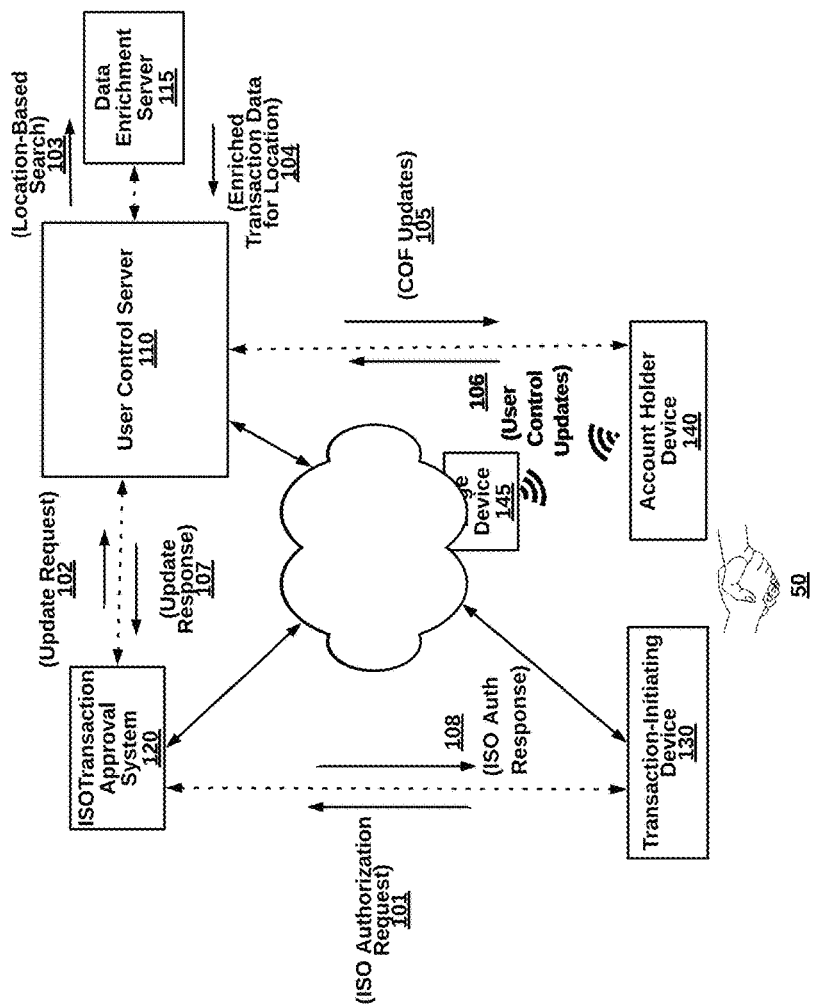
FIG. 1 is a high-level block diagram illustrating a system for injecting user control for user card updates automatically applied to COF merchants and recurring payment transactions of an ISO transaction approval system, according to an embodiment.

FIG. 1 is a high-level block diagram illustrating a system 100 for injecting user control (e.g., for user card updates automatically) applied to COF merchants and recurring payment transactions of an ISO transaction approval system, according to an embodiment. The system 100 primarily comprises a user control server 110, a transactional approval system 120, a transaction-initiating device 130 and an account holder device 140. Additional network components can also be part of the system 100, such as firewalls, virus scanners, routers, switches, application servers, databases, data lakes, data warehousing, as well as additional controllers, access points, access switches, stations, SDN (Software-Defined Networking) controllers, Wi-Fi controllers, and the like. The network components can be implemented as hardware, software, or a combination of both, for example, as described with respect to the computing environment of FIG. 10.

Each of the primary components are coupled in communication through a network 199. The account holder device 140 may be a mobile device using Wi-Fi or cellular, for example, that couples to an edge device 145 for access to the network 199. The network 199 may be the Internet, a wide area network, a local area network, a cellular network (e.g., 3G, 4G, 5G or 6G), Wi-Fi, or a hybrid network.

The user control server 110, in one embodiment, receives an update request 102 along with a copy of an ISO authorization request 101 and responds with an update response 102. The update response 102 can include a new user card number, a new expiration date, a product upgrade, information from a portfolio conversion, user controls, or the like. To determine updates, the user control server 110 continually classifies ISO transactions to identify COF merchants and recurring payments associated with a particular user card. A list of COF merchants and recurring payments is determined, and updated as new ISO transactions are classified. The user control server 110 can provide the list of COF merchants and recurring payments back to elements of the ISO transaction approval system 120, such as a financial institution or issuer processor. COF merchants, as referred to herein, store user card data used by a merchant device to fund purchases that are either automatically triggered (Amazon Prime annual fee) or manually triggered (e.g., Amazon toy purchase). Further, recurring transactions are subset of transactions conducted by the COF merchant. A transaction is recurring if it is automatically conducted at some frequency for a standard amount. The Amazon Prime annual fee may be charged on May 1st of each year with the same card data, recurring, and without new authorization from the card holder. In one embodiment, besides detecting recurring merchants (merchant-level insights), it can also detect recurring insights at the combination of card and merchant level. So, for each card and merchant information, frequency, trial end date, next billing date, and estimated amount, are known based on history.

In an embodiment, updates to a specific user card are received and processed by the user control server 110. The updates can be initiated by financial institutions or issuer processors or by users themselves. For example, when a new user card is requested or automatically dispatched by mail to a Chase card holder, Chase can immediately send updated card information to the user control server 110 over a secure channel before the Chase card holder is even aware that the new user card exists. The update, in turn, can be applied to the list of COF and recurring payments in either a push or pull distribution. The user can also be notified of COF updates 105 and make decisions to inject control how the new information is disseminated. In some cases, a card user may be suspicious of a particular merchant or POS type and wish to discontinue by precluding the update. A user app on the account holder device 140 with a touch screen button can be pressed, thereby providing card users with easy access to a traditionally closed loop ISO transaction approval system 120.

The data enrichment server 115, in one embodiment, extracts raw merchant data from the ISO authorization request for conversion to enriched merchant data for the list of merchants. The raw merchant data is typically customized by a particular merchant and their business practice, or there is any protocol at all. Enriched merchant data, on the other hand, is normalized with known commercial names. This prevents several different COF merchant entries for a common merchant, for example, at different locations. While raw merchant data can have 2, 10 or more variations, enriched merchant data is coalesced under a single entry. When a customer wants to cancel a recurring payment at Walmart, for example, all the transactions and actions are accessible under a single commercial name rather than having to individually check each name and decipher raw merchant data. Some merchants have more than one enriched merchant names, such as Amazon Prime and Amazon Fresh. In one embodiment, the data enrichment server 115 is an optional part of the system 100.

For the data enrichment option, the user location 103 for the account holder device 140 can be pushed or pulled and utilized to filter search results of a places server. For example, a data field has WLMRT within close proximity to a known Walmart store, the custom abbreviation can be enriched to the common trade name. The location is preferably in real-time with data enrichment, but in some cases, is done asynchronously. GPS, Wi-Fi triangulation, IP address analyses, or other techniques at the account holder device 140 determines local geo-coordinates and sends to the data enrichment server 115. In one case, the data enrichment server 115 uses algorithms to predict the location based on previous locations. In another case, the data enrichment server 115 infers location from the merchant location, IP address, or any other appropriate technique.

In some embodiments, the data enrichment server 115 is part of a third-party fraud detection system, separate from the card updater system or the transaction approval system 120. In other embodiments, the data enrichment server 115 can be integrated with the user control server 110. The data enrichment server 115 is set forth in more detail with respect to FIG. 4 below.

The transactional approval system 120, in an embodiment, is a backend to a payment authorization system for credit card transactions for a merchant. The transactions can be financial transactions, such as a credit card approval, a debit card approval, an ACH, or other financial transactions. In other embodiments, the transactions are non-financial. The financial transaction approval system can include an acquirer processor, a card network, an issuer processor, a card issuer, and an account host. Responsive to a transaction initiated at the merchant, the acquirer processor can send the ISO authorization request according to the ISO 8583 standard, including a ×100 or a ×200 message type, with a transaction card number, transaction card credentials, merchant information, transaction amount, and other mandatory and optional fields. The card network does validity checks on the ISO authorization request and involves any additional services the acquirer or issuer have signed up for (such as address validation, PIN validation, risk scoring, and the like), and then forward the ISO authorization request to the issuer processor. The issue processor can perform validity checks and invoke value-added services such as risk scoring and cardholder policy checks, before checking with an account host if a user account has adequate funds to satisfy a transaction request. The account host responds to the issuer processor with an approval or denial that the issuer processor can form into an ISO authorization response, along with a approve or denial reason code. The card network forwards the ISO authorization response to the acquirer processor, and in turn, back to the merchant at the POS. Many other approval systems are possible.

In one embodiment, the transactional approval system 120 subscribes to the user control server 110 for updates to user card data. For instance, an update service can check for any changes to user card data stored by a merchant device. Data can be pushed through a subscription, or data can be pulled by merchant checks.

Conventional payment authorization systems typically block out the account holder device 140 from participation in approvals through payment controls. By contrast, the user control server 110 is able to implement controls of the account holder device 140 by registering a user account with a third party administrating the data enrichment server 115.

In an alternative embodiment, a third-party COF server (not shown) provides user control of COF merchants outside of the ISO transactional approval system 120. In other words, one embodiment bypasses the traditional financial system for managing COF merchants and recurring transactions.

The transaction-initiating device 130, can be a merchant device or other POS, where a merchant swipes a transaction card through a transaction card reader which uses transceiver coupled to the network 199 for transmitting an ISO authorization request to the transaction approval system 120 for approval. In an embodiment, the transaction-initiating device 130 is a COF merchant storing user card data, for various reasons. In one instance, Amazon stores user cards for easy check out. In another instance, Spotify stores user cards, and charges a premium service fee at the same time of each month, for the same amount each month. Some COF transactions are recurring transactions. One implementation of the transaction-initiating device 130 is a terminal at a gym using Stripe to charge for membership services. The card may be stored for monthly fees. If the case of updated user card data, the transaction-initiating device 130 avoids declines by pushing the update initiated by a user.

The account holder device 140 for a purchaser, for example, can be a user device such as a mobile telephone, electronic payment device, an iPad, laptop computer, or the like. The purchaser or other user logs onto the data enrichment server 110 with authentication credentials to create a secure channel for location sharing, changing transaction controls, and managing transactions. In one implementation, a mobile application is downloaded to the account holder device 140 for communication with the user control server 110. In another embodiment, an operating system or Bluetooth-connected device communicates with the data enrichment sever 110.

Figure 2:
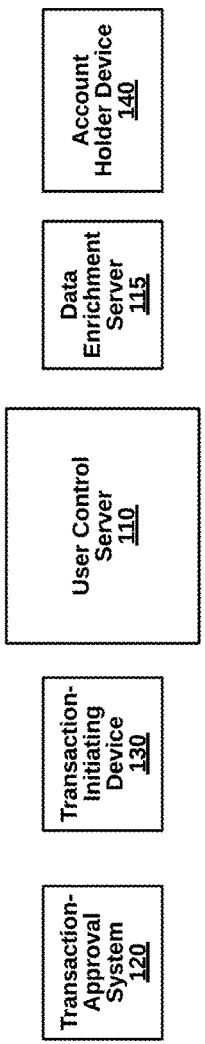
FIG. 2 is a sequence diagram illustrating interactions between the components of the system of FIG. 1, according to an embodiment.
Figure 2:
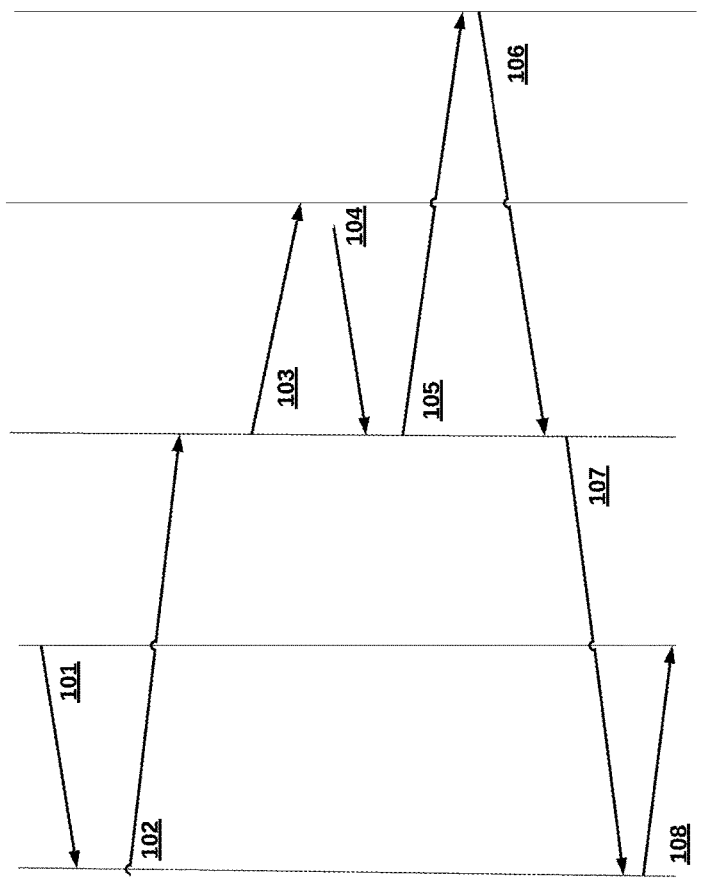

FIG. 2 is a sequence diagram illustrating interactions between the components of the system of FIG. 1, according to an embodiment. Variations in the sequence are possible. For instance, real-time card updates and real-time user controls are shown in the interactions of FIG. 2. However, in other embodiments, updates can be pulled from the user control server 110 in batch mode. In still other embodiments, user COF controls are applied separately from real-time ISO transactions.

At interaction 101, the transaction-initiating device 130 receives data from a payment card swipe by the merchant or the user (or Apple Pay, an NFC contactless swipe, or otherwise) thereby initiating the network security techniques descried herein. Data packets including an ISO authorization request are sent to the transactional-approval system. The transmission channel can be, for example, an end-to-end wired connection, a Wi-Fi or other wireless connection, or a hybrid network.

At interaction 102, an update request checks for COF or recurring payment updates by sending a copy of the ISO authentication request. In turn, a location-based search query is sent to the place server 115 at interaction 103 and a response is sent back at interaction 104. The list of merchants compiled from enriched data can be sent as COF updates, at interaction 105, to the account holder device. User actions, user payment controls, geographical fencing, or charge amount limitations, or other processes can be applied at this point and are sent as user COF controls, at interaction 106, from the account holder device 150 back to the user control server 110. At interaction 107, an update response is sent back to the transaction approval system 120. At interaction, 108 the ISO authorization response is sent to the transaction-initiating device 130. In response, a release of goods to the user can be allowed or disallowed by the merchant, in one example.

Figure 3B:
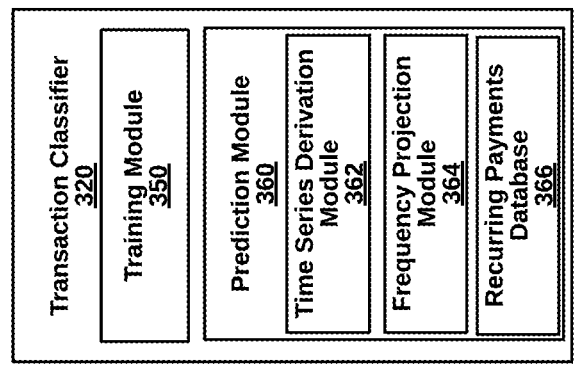
FIGS. 3A and 3B are more detailed block diagram illustrating a user control server of the system of FIG. 1, according to some embodiments.
Figure 3A:
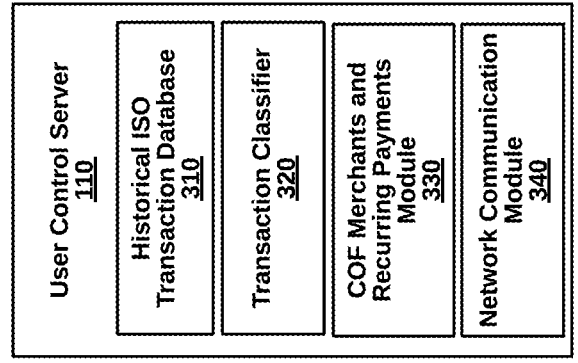

FIG. 3A is a more detailed block diagram illustrating a user control server of the system of FIG. 1, according to some embodiments. The data enrichment server 110 includes a historical ISO transactional database 310, a transaction classifier 320, a COF merchants and recurring payments module 330, and a network communication module 340. The components can be implemented in hardware, software, or a combination.

The historical ISO transactional database 310 stores previous ISO authentication requests and responses for training the transaction classifier 320. The previous transactions can be limited to a specific user, a specific location (e.g., zip code, city or state), a specific transaction type (e.g., recurring transactions), or as otherwise needed for a specific implementation.

The transaction classifier 320 can use numeric or signal processing modeling to identify COF merchants and recurring payments. One instance uses discrete Fourier transformational power spectral density for accurate and deep learning from the past ISO transactions. To do so, transactions are projected onto the frequency (sinusoids) domain. Perfectly sinusoidal data will have one spike. Periodic yet not sinusoidal data will have one spikes at the integer multiple of the frequency. Noise will have no spike, indicative of no recurring payments. Further, a periodogram/PSD involves the square of the magnitude of discrete Fourier transform to provide a good estimation from energy concentrated around certain frequencies.

Other instances of the transactional classifier 320 can also incorporate a simple moving average, exponential smoothing, ARIMA, SARIMA, RNNs, or machine learning classifier either separately or in combination with spectral density analysis. In still other instances a flag is set in the data field 58.4 of the ISO 8583 format, or alternatively or in combination with, flags in data field 22 for POS entry mode and field 126 for POS environmental, and other variations. The data field 58.4 flag indicates that a recurring transaction is occurring. This self-identification of COF merchants can also be added to the COF list and the recurring transactions list. Other flags can include data field 61, for instance. In still another embodiment, a recurring transaction is identified when a first transaction includes account verification with a CVV2 or security code indicator set and subsequent transactions are higher than $0 do not include a CVV2.

The COF merchants and recurring payments module 330 compiles, updates and distributes the list of COF merchants and recurring payments, in an embodiment. A user interface can communicate with the account holder device 140 to provide a display to card users to verify and control. The user interface can provide settings for notifications about updates to the user. At the same time, subscriptions to the update servers with financial institutions, and other aspects of the transaction system 120.

The network communication module 340 can include a network interface, transceivers, antenna, protocol software, operating systems, APIs and other necessary components.

FIG. 3B further details the transactions classifier 320, in an embodiment, to include a training module 350 and a prediction module 360. The training module 350 uses the training set to identify the elbow points where the power density has a significant drop in value. Multiple elbow points may be present, since the power density may be amplified further when there are multiple recurring patterns. The training module then produce the best threshold value to use for differentiating a recurring pattern vs a non-recurring pattern.

The prediction module 360 in turn includes a time series derivation module 362, a frequency projection module 364 and a recurring payments database 366. After old ISO transactions are processed for training by the training module 350, predictions for identifying recurring payments can be made in real-time or batch by the prediction module 360. Further details are set forth below with respect to FIGS. 6A and 6B.

Figure 4:
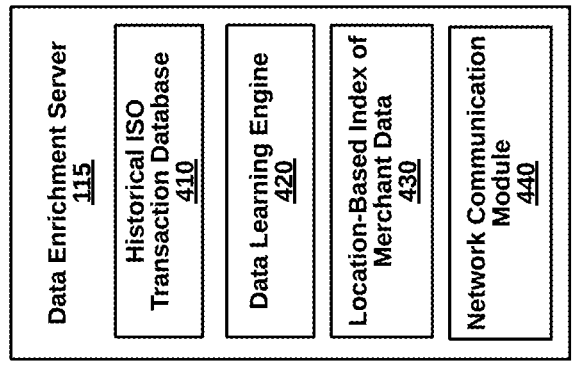
FIG. 4 is a more detailed block diagram illustrating a data enrichment server of the system of FIG. 1, according to some embodiments.

FIG. 4 is a more detailed block diagram illustrating a data enrichment server 115 of FIG. 1, according to some embodiments. The data enrichment server 115 includes a historical ISO transactional database 410, a data learning engine 420, a location-based index of merchant data 430 and a network communication module 440. The components can be implemented in hardware, software, or a combination.

The historical ISO transactional database 410 stores previous ISO authentication requests and responses for training the data learning engine 420. The previous transactions can be limited to a specific user, a specific location (e.g., zip code, city or state), a specific transaction type (e.g., recurring transactions), or as otherwise needed for a specific implementation. In an alternative embodiment, the historical ISO transactional database 410 stores previous ISO authentication request for other users. As a result, recurring transactions can be identified for a particular user from historical information and patterns of others. This is particularly useful for identifying recurring payments from a first payment of the series, for example.

The location-based index of merchant data 430 is generated from the learning process as varying merchant names are coalesced under a single name, and payment controls are implemented through the single name. Being local to the data enrichment server 115, one embodiment provides real-time look-up of enriched merchant data and when there is a cache miss, raw merchant data is used for making decisions. The enriched data can be retrieved from a places server. Preferably, the data enrichment server 115 is under independent control from the transaction approval system 120. As a result, the location-based index is controlled and leveraged by the user typically precluded from the ISO transaction data path.

The network communication module 440 can include a network interface, transceivers, antenna, protocol software, APIs and other aspects necessary II. Methods for Injecting User Control to COF User Card Data and Transaction Parameters (FIGS. 5-9)

Figure 5:
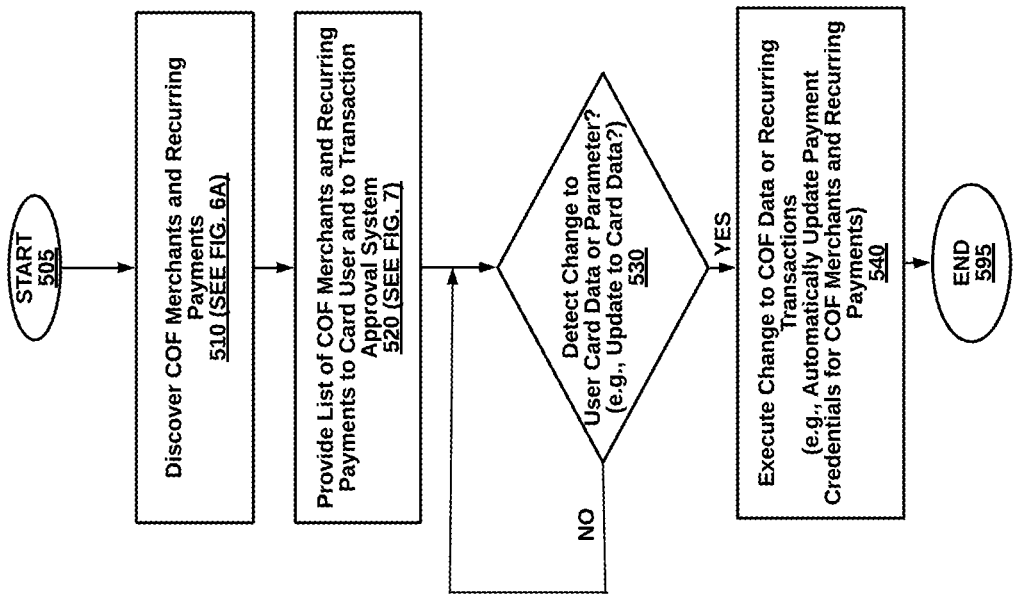
FIG. 5 is a high-level flow diagram illustrating a method for injecting user control for user card updates automatically applied to COF merchants and recurring payment transactions of an ISO transaction approval system, according to an embodiment.

FIG. 5 is a high-level flow diagram illustrating a method for injecting user control for user card data (e.g., user card updates) automatically applied to COF merchants and recurring payment transactions of an ISO transaction approval system, according to an embodiment. The steps herein are merely example groupings of functionality that can be performed in different orders, enhanced with other steps, and otherwise modified under the spirit of the present disclosure.

At step 510, COF merchants and recurring payments are discovered, as described in more detail with respect to FIG. 6. At step 520, a list of COF merchants and recurring payments are provided to card users and/or to a transaction approval system, as shown with further detail in FIG. 7. If a change to user card data or parameter is detected (e.g., an update to a card for a specific card user is detected) at step 530, at step 540 payment credentials for COF merchants and recurring payments are automatically updated, as described throughout the disclosure.

Figure 6A:
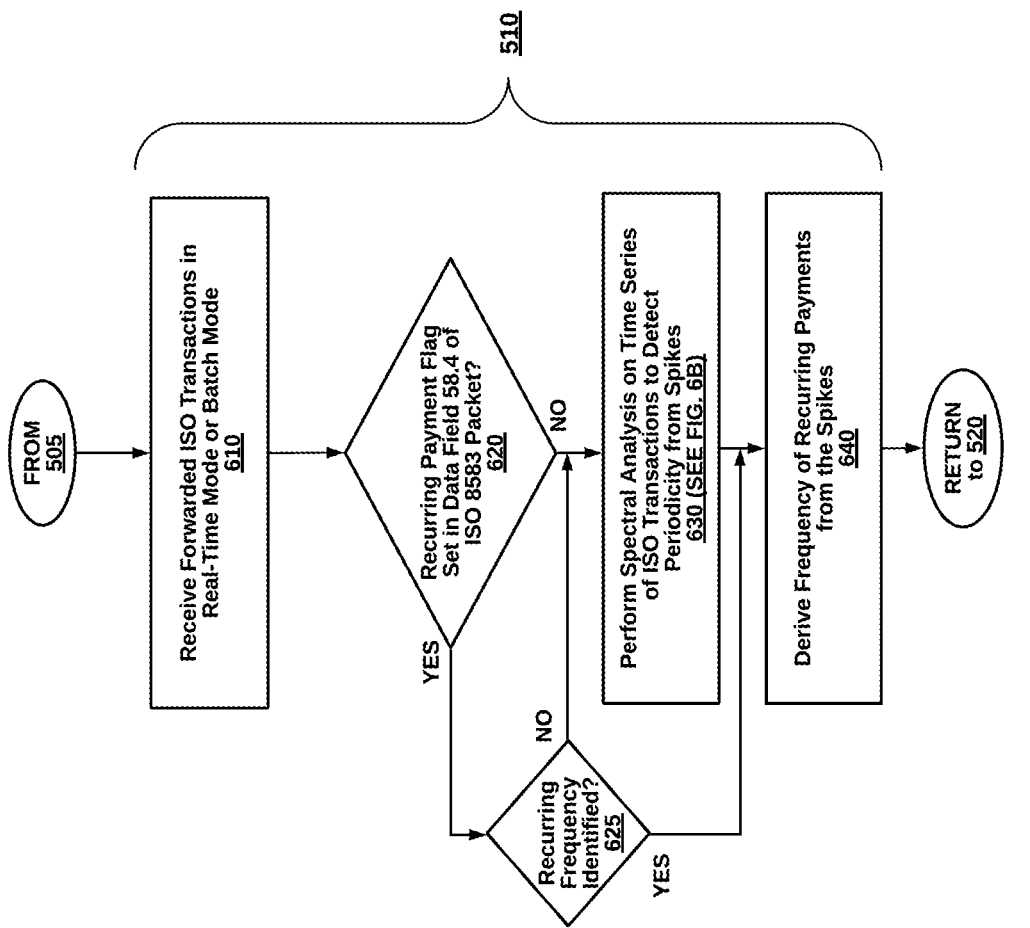
FIG. 6A is a more detailed flow diagram illustrating a step of discovering COF merchants and recurring payments, from the method of FIG. 5, according to an embodiment.

Recurring payments can be explicitly or implicitly identified. FIG. 6A is a high-level flow diagram illustrating a step of discovering COF merchants and recurring payments, in the method of FIG. 5, according to an embodiment. At step 610, ISO transactions are forwarded in real-time or batch mode for analysis. If a recurring payment flag is set for explicit identification of recurring payments, for example in data field 58.4 of an ISO 8583 format packet at step 620, the merchant is added to the COF merchant list. Another embodiment uses alternative data fields for the recurring data, such as data field 60 and data field 126, depending on whether the transaction is an US transaction or a non-US international transaction. In some embodiments, although the recurring payments are explicit, the frequency is not explicitly identified in step 625. Thus, spectral analysis is performed, at step 630, in order to determine a frequency (e.g., daily, weekly, monthly). Besides spectral analysis, in other embodiments, different transaction attributes are analyzed. If the recurring payment flag is explicitly set at step 620 and frequency is explicitly identified at step 625, the process continues to step 520 for providing the COF merchants and recurring payments list.

In one case, at step 620, if the recurring payment flag is not set, spectral analysis can be performed at step 620 to identify recurring payments in an implicit manner. Next, at step 640, a frequency of recurring payments is derived from the spikes of the spectral analysis. In one embodiment, step 640 is not performed due to poor results in the spectral analysis of step 630, failing to implicitly identify recurring payments. The process then returns to step 520 of FIG. 5.

Figure 6B:
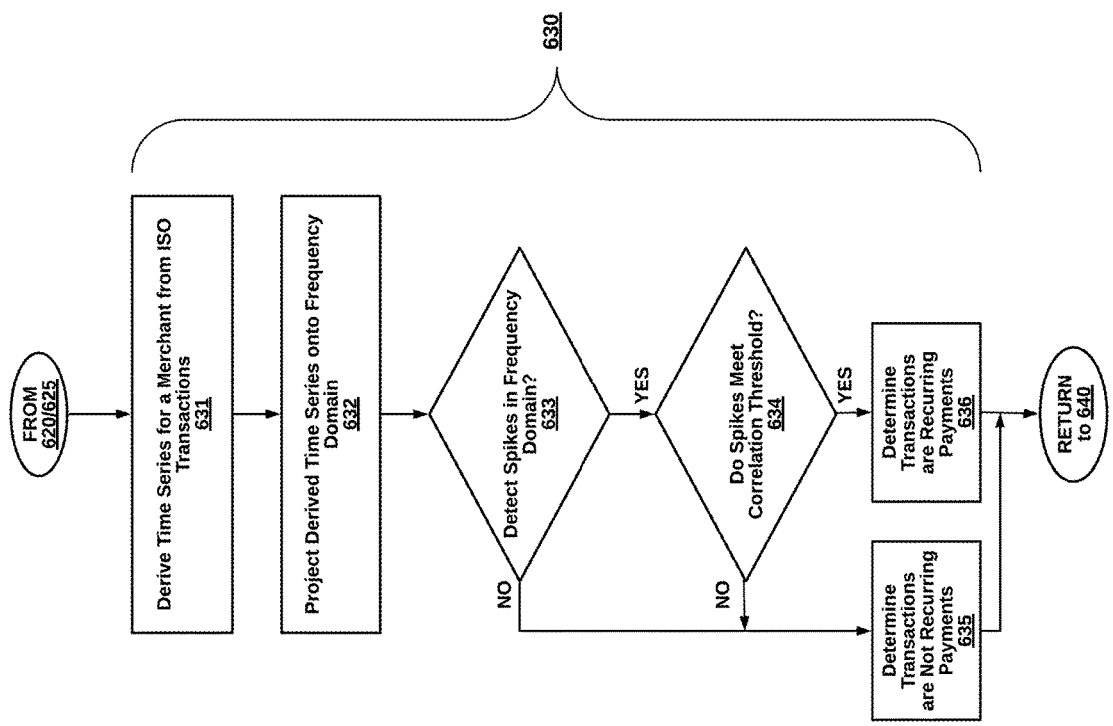
FIG. 6B is a more detailed flow diagram illustrating a step of performing spectral analysis on a time series of ISO transactions to detect periodicity from spikes, from the method of FIG. 6A, according to an embodiment.

The spectral analysis step of 630 is further defined in FIG. 6B. In one embodiment, a time series for a merchant is derived from ISO transactions, in step 631. The derived time series is then projected onto a frequency domain, in step 632. If spikes are detected in step 633 that meet a correlation threshold in step 634, the transactions are determined to be recurring payments in step 656. For example, perfectly sinusoidal data has one spike. Periodic, yet non sinusoidal data has spikes at the integer multiple of the predominant frequency. The multiple spikes are generally caused by spectral leakage due to the imperfect data Otherwise, if there are no spikes in frequency detected at step 633, or the detected spikes of step 633 do not meet the correlation threshold at step 634, it is determined that the time series contains no recurring payments at step 635. For instance, white noise has no spike.

A user can have multiple subscriptions of recurring transactions with a single vendor. The statistical modeling or spectral analysis can be used to detect the available subscription price points for a given merchant, since the transactions at each price point should yield strong recurring pattern at a certain frequency.

The spectral analysis result can be combined with other features derived from transaction data in machine learning models to further fine tune the prediction accuracy. For instance, a machine learning classifier, such as a neural network based classifier or a traditional random forest based classifier, can be used to combine the features including the periodicity and price points from the spectral analysis, the POS entry mode, amount, terminal class (attended or unattended, customer operated or card acceptor operated, on-premise or off-premise), presentation type (card present or card not present, customer present or customer not present), terminal type (home terminal, dial terminal, ecommerce terminal, etc.), payment token types, token device types, and other POS condition codes to predict whether the transaction is a recurring payment or not.

In the case a price point has been detected for recurring payments from the spectral analysis, the price point can be used to alert the user whenever there is an event of price divergence in the same recurring series. In addition, the user's price point can be compared with other similar users for the same merchant at the same city or at the same region, to further inform the users whether or not an anomaly has occurred, and whether or not they should contact the merchant for the difference in charges.

In the case that a spectral analysis does not yield strong recurring pattern for a transaction, which could happen when a given card does not have enough historical transactions on a given merchant, e.g. during the cold start period for a card and merchant, the spectral analysis result (frequency, price point) from other cards on the same merchant can be crowd-sourced as additional features to determine whether this transaction is recurring or not. Such crowd-sourced features can also POS entry mode, terminal class (attended or unattended, customer operated or card acceptor operated, on-premise or off-premise), presentation type (card present or card not present, customer present or customer not present), terminal type (home terminal, dial terminal, ecommerce terminal, etc.), payment token types, token device types, and other POS condition codes.

In some cases, a merchant may send incorrect recurring indicator in the transaction data. For example, Apple iTune may set the recurring flag for a regular non-recurring eCommerce transaction, regardless of whether the transaction is recurring or not. In such cases, the same model with the same features can be used to detect and correct the incorrect flagging of the transaction. New rules can be automatically generated and implemented.

Figure 7:
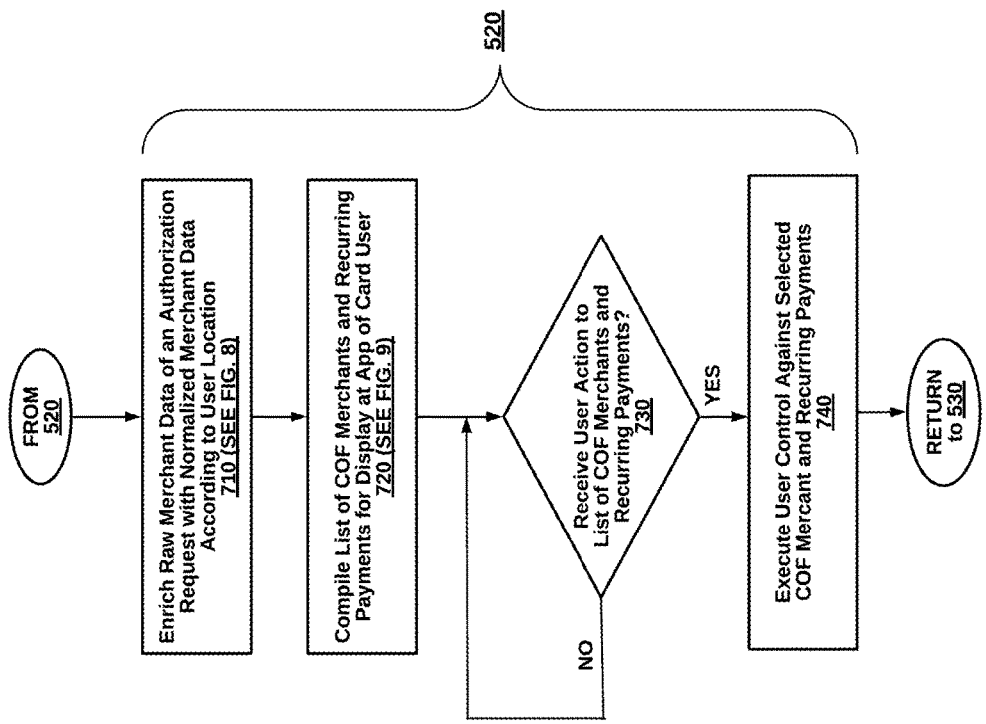
FIG. 7 is a high-level flow diagram illustrating a step of providing a list of COF merchants and recurring payments to card users and to transaction approval system, in the method of FIG. 5, according to an embodiment.

FIG. 7 is a high-level flow diagram illustrating a step of providing a list of COF merchants and recurring payments to card users and to transaction approval system, in the method of FIG. 5, according to an embodiment. At step 710, raw merchant data of an authorization request is enriched with normalized merchant data according to a user location, as set forth below in association with FIG. 8. The data enrichment can be performed prior to identifying recurring payments, in some embodiments. At step 720, a list of COF merchants and recurring payment is compiled for display at, for example, a mobile app on a smartphone of the card user. If user actions to list of COF merchants and recurring payments is received at step 730, at step 740, the user control (e.g., cancel, update or limit) is executed against COF merchant and recurring payments. The process returns to step 530 of FIG. 5

Figure 8:
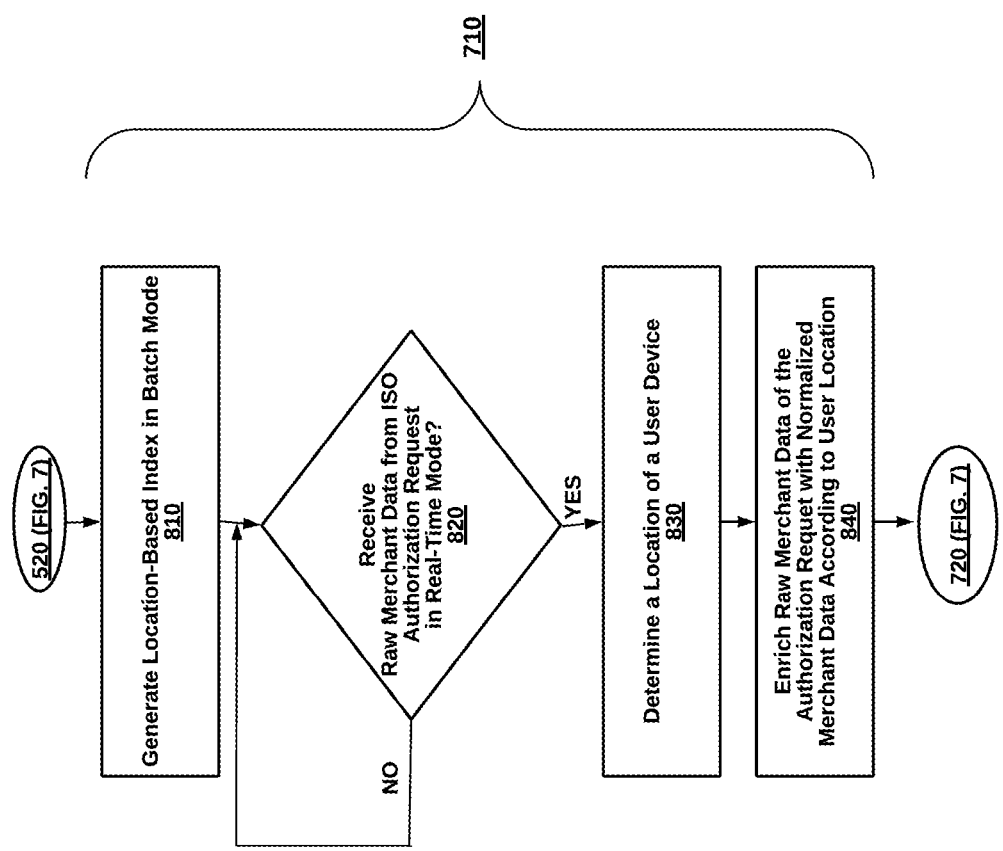
FIG. 8 is a high-level flow diagram illustrating a step of enriching raw merchant data of an authorization request with normalized merchant data according to user location, in the method of FIG. 7, according to an embodiment.

FIG. 8 is a high-level flow diagram illustrating a step of enriching raw merchant data of an authorization request with normalized merchant data according to user location, in the method of FIG. 7, according to an embodiment.

At step 810, a location-based index is generated in batch mode. At step 820, responsive to receiving raw merchant data parsed from an ISO authorization request for a transaction in process, a location of a user device is determined at step 830. At step 840, raw merchant data is enriched with normalized merchant data according to the user location.

FIG. 9 is a table illustrating an example of user controls for the list of COF merchants and recurring payments displayed on an app of card users, according to an embodiment. As shown, COF merchants are listed, some of which have associated recurring payments (i.e., 24-hour Fitness at $29.99 per month, and gas company billing on the 8th day of the month, although amounts may be different) and some do not have associated recurring payments (i.e., Amazon stored a card but purchases are not necessarily periodic in amount or date). Further, user controls allow a direct action to the COF merchant such as canceling the COF information, confirming the recurring payment, limiting charges by geo-location or amount, updating the card, clicking to contact the merchant, and alerting the user. The user can update the card or give permission to the card updater to do so automatically. Many other variations are possible.

III. Processor-Driven Computing Device (FIG. 10)

FIG. 10 is a block diagram illustrating an exemplary computing device 1000 for use in the system 100 of FIG. 1, according to one embodiment. The computing device 1000 is an exemplary device that is implementable for the user control server 110, each of the components of ISO transactional system 120, the transaction-initiating device 130, or the account holder device 140. Additionally, the computing device 1000 is merely an example implementation itself, since the system 100 can also be fully or partially implemented with laptop computers, tablet computers, smart cell phones, Internet appliances, and the like.

The computing device 1000, of the present embodiment, includes a memory 1010, a processor 1020, a storage drive 1030, and an I/O port 1040. Each of the components is coupled for electronic communication via a bus 1099. Communication can be digital and/or analog, and use any suitable protocol.

The memory 1010 further comprises network applications 1012 and an operating system 1014. The network applications 1012 can include a web browser, a mobile application, an application that uses networking, a remote application executing locally, a network protocol application, a network management application, a network routing application, or the like.

The operating system 1014 can be one of the Microsoft Windows®. family of operating systems (e.g., Windows 95, 98, Me, Windows NT, Windows 2000, Windows XP, Windows XP x104 Edition, Windows Vista, Windows CE, Windows Mobile, Windows 7, Windows 8, and Windows 10), Android, Linux, HP-UX, UNIX, Sun OS, Solaris, Mac OS X, Alpha OS, AIX, IRIX32, or IRIX104. Other operating systems may be used. Microsoft Windows is a trademark of Microsoft Corporation.

The processor 1020 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 1020 can be single core, multiple core, or include more than one processing elements. The processor 1020 can be disposed on silicon or any other suitable material. The processor 1020 can receive and execute instructions and data stored in the memory 1010 or the storage device 1030.

The storage device 1030 can be any non-volatile type of storage such as a magnetic disc, EEPROM, Flash, or the like. The storage device 1030 stores code and data for applications.

The I/O port 1040 further comprises a user interface 1042 and a network interface 1044. The account holder interface 1042 can output to a display device and receive input from, for example, a keyboard. The network interface 1044 connects to a medium such as Ethernet or Wi-Fi for data input and output. In one embodiment, the network interface 1044 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

We claim:

1. A method comprising:
   receiving, by a server, a plurality of historical transaction records from a historical transaction database, wherein each of the plurality of historical transaction records is associated with a cardholder;
   performing, by the server, spectral analysis on the plurality of historical transaction records by:
      deriving, by the server, time-series data from the plurality of historical transaction records;
      projecting, by the server, the time-series data onto a frequency domain;
      detecting, by the server, two or more spikes in the frequency domain;
      determining, by the server, whether the two or more spikes satisfy a predetermined threshold; and based on the two or more spikes satisfying the predetermined threshold, identifying, by the server, recurring payments associated with a merchant;

determining, by the server, a price point for the merchant associated with the identified recurring payments;

generating, by the server, an alert to the cardholder including the identified recurring payments and the associated price point;

receiving, by the server, a response from the cardholder in response to the identified recurring payments;

determining, by the server, based on the response from the cardholder, if changes to the identified recurring payments are needed; and updating, by the server, the identified recurring payments based on the determined changes.

2. The method of claim 1, wherein updating the identified recurring payments comprises providing, by the server and to the merchant, updated account information associated with the cardholder.

3. The method of claim 2, wherein the updated account information comprises at least one of an account number associated with the cardholder or an expiration date of a payment instrument associated with the cardholder.

4. The method of claim 1, wherein updating the recurring payments comprises blocking the identified recurring payments.

5. The method of claim 1, wherein performing the spectral analysis on the plurality of historical transaction records further comprises determining that the merchant has set up the identified recurring payments for more than one subscription with the cardholder, and wherein determining that the merchant has set up the identified recurring payments for more than one subscription comprises:

detecting, by the server, a cardholder price point associated with at least one of the more than one subscriptions; and comparing, by the server, the cardholder price point to an alternate price point of a similar cardholder.

6. The method of claim 1, further comprising:

enriching, by the server, data concerning the merchant associated with the identified recurring payments or the identified recurring payments, wherein the enriched data comprises one of an enriched merchant name, a merchant identification, a URL, a phone number, a merchant email, a frequency of the identified recurring payments associated with the merchant, or a description of the identified recurring payments associated with the merchant, and wherein the identified recurring payments sent to the cardholder comprise the enriched data.

7. The method of claim 1, further comprising:

establishing, by the server, a secure channel between the cardholder and the server in response to a receipt of an authentication credential from the cardholder; and sending, by the server, the identified recurring payments to the cardholder over the secure channel.

8. A non-transitory computer-readable media comprising computer-readable instructions stored thereon which, when executed by one or more processors of a server, cause the one or more processors to perform a process comprising:

receiving a plurality of historical transaction records from a historical transaction database, wherein each of the plurality of historical transaction records is associated with a cardholder;

performing spectral analysis on the plurality of historical transaction records by:

deriving time-series data from the plurality of historical transaction records;

projecting the time-series data onto a frequency domain;

detecting two or more spikes in the frequency domain;

determining whether the two or more spikes satisfy a predetermined threshold; and based on the two or more spikes satisfying the predetermined threshold, identifying recurring payments associated with a merchant;

determining a price point for the merchant associated with the recurring payments;

generating an alert to the cardholder including the identified recurring payments and the associated price point;

receiving a response from the cardholder in response to the identified recurring payments;

determining based on the response from the cardholder, if changes to the identified recurring payments are needed; and updating the identified recurring payments based on the determined changes.

9. The non-transitory computer-readable media of claim 8, wherein to update the identified recurring payments, the one or more processors further execute computer-readable instructions to provide to the merchant, updated account information associated with the cardholder.

10. The non-transitory computer-readable media of claim 9, wherein the updated account information comprises at least one of an account number associated with the cardholder or an expiration date of a payment instrument associated with the cardholder.

11. The non-transitory computer-readable media of claim 8, wherein to update the identified recurring payments, the one or more processors further execute computer-readable instructions to block the identified recurring payments.

12. The non-transitory computer-readable media of claim 8, wherein to perform the spectral analysis on the plurality of historical transaction records, the one or more processors further execute computer-readable instructions to determine that the merchant has set up the identified recurring payments for more than one subscription with the cardholder by:

detecting, by the server, a cardholder price point associated with at least one of the more than one subscriptions; and comparing, by the server, the cardholder price point to an alternate price point of a similar cardholder.

13. The non-transitory computer-readable media of claim 8, wherein the one or more processors further execute computer-readable instructions to enrich data concerning the merchant associated with the identified recurring payments, or the identified recurring payments, wherein the enriched data comprises one of an enriched merchant name, a merchant identification, a URL, a phone number, a merchant email, a frequency of the identified recurring payments associated with the merchant, or a description of the identified recurring payments associated with the merchant, and wherein the identified recurring payments sent to the cardholder comprise the enriched data.

14. The non-transitory computer-readable media of claim 8, wherein the one or more processors further execute computer-readable instructions to:

establish a secure channel between the cardholder and the server in response to a receipt of an authentication credential; and send the identified recurring payments to the cardholder over the secure channel.

15. A system comprising:
a memory having computer-readable instructions stored thereon; and
one or more processors executing the computer-readable instructions to:
receive a plurality of historical transaction records from a historical transaction database, wherein each of the plurality of historical transaction records is associated with a cardholder;
perform spectral analysis on the plurality of historical transaction records by:
deriving time-series data from the plurality of historical transaction records;
projecting the time-series data onto a frequency domain;
detecting two or more spikes in the frequency domain;
determining whether the two or more spikes satisfy a predetermined threshold; and
based on the two or more spikes satisfying the predetermined threshold, identifying recurring payments associated with a merchant;
determine a price point for the merchant associated with the identified recurring payments;
generate an alert to the cardholder including the identified recurring payments and the associated price point;
send the identified recurring payments to the cardholder;
receive a response from the cardholder in response to the identified recurring payments;
determine, based on the response from the cardholder, if changes to the identified recurring payments are needed; and
update the identified recurring payments based on the determined changes.

16. The system of claim 15, wherein to update the identified recurring payments, the one or more processors further execute computer-readable instructions to provide to the merchant, updated account information associated with the cardholder.

17. The system of claim 15, wherein the updated account information comprises at least one of an account number associated with the cardholder or an expiration date of a payment instrument associated with the cardholder.

18. The system of claim 15, wherein to update the identified recurring payment, the one or more processors further execute computer-readable instructions to block the identified recurring payment.

19. The system of claim 15, wherein to perform the spectral analysis on the plurality of historical transaction records, the one or more processors further execute computer-readable instructions to determine that the merchant has set up the identified recurring payments for more than one subscription with the cardholder by:
detecting a cardholder price point associated with one of the more than one subscriptions, and
comparing the cardholder price point to an alternate price point of a similar cardholder.

20. The system of claim 15, wherein the one or more processors further execute computer-readable instructions to enrich data concerning the merchant associated with the identified recurring payments or the identified recurring payments, wherein the enriched data comprises one of an enriched merchant name, a merchant identification, a URL, a phone number, a merchant email, a frequency of the identified recurring payments associated with the merchant, or a description of the identified recurring payments associated with the merchant, and wherein the identified recurring payments sent to the cardholder comprise the enriched data.

21. The system of claim 15, wherein the one or more processors further execute computer-readable instructions to:
establish a secure channel between the cardholder and the one or more processors in response to a receipt of an authentication credential; and
send the identified recurring payments to the cardholder over the secure channel.

* * * * *